Feb. 5, 1963  H. G. JOHNSON  3,076,228
METHOD AND APPARATUS FOR FORMING CORRUGATED TUBES, ESPECIALLY
FOR MAKING GASKETS, AND THE PRODUCT THEREOF
Filed Nov. 7, 1960  2 Sheets-Sheet 1

INVENTOR.
Herbert G. Johnson

INVENTOR.
Herbert G. Johnson

United States Patent Office 3,076,228
Patented Feb. 5, 1963

3,076,228
METHOD AND APPARATUS FOR FORMING CORRUGATED TUBES, ESPECIALLY FOR MAKING GASKETS, AND THE PRODUCT THEREOF
Herbert G. Johnson, Havertown, Pa.
Filed Nov. 7, 1960, Ser. No. 67,779
6 Claims. (Cl. 18—19)

This invention relates to method and apparatus for forming corrugated tubes, especially for making sheathed gaskets, and to the product thereof; and has for an object the provision of improvements in this art.

One of the particular objects of the invention is to provide a simple and inexpensive method for making multi-ply gaskets with a sheath-protected core.

Another object is to provide simple and inexpensive apparatus for making multi-ply and sheathed gaskets.

Another object is to provide an improved type of sheathed core gasket.

Another object is to provide a simple and convenient assembly for forming a corrugated tube with heat and for quickly removing the assembly with the formed tube and quenching it.

The above and other objects and advantages of the invention will be apparent from the following description of an exemplary embodiment, reference being made to the accompanying drawings, wherein.

The invention can be used for making gaskets of various materials for various uses but is believed to have special advantages for making gaskets which are sheathed with materials which are highly resistant to most harmful agents encountered in the new arts of nuclear reactions and the like. One of the best materials presently used for resisting attack is polytetrafluoroethylene (PTFE, usually referred to by the trade name "Teflon"). Others of a similar nature, such as "Kel-F" and the like, are known.

The present method of making a sheathed core gasket of PTFE, so far as known, is to machine out a solid rod or thick-walled tube of PTFE to form spaces for cores, put in the cores, and secure them in the sheath thus formed. This procedure is slow and intricate and very wasteful of extremely expensive material.

Figure 1:
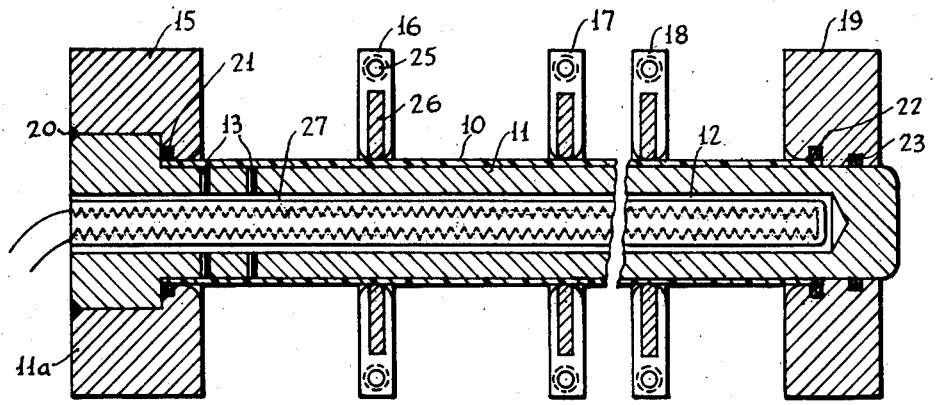
FIG. 1 is a longitudinal section through apparatus for forming a corrugated tube and gasket, the parts being shown in the initial stage in which a tube and other elements have just been set up in the machine.

The present invention requires only a simple tube 10, FIG. 1, which is placed on a mandrel 11 having a fluid duct 12 with ports 13 for supplying pressure fluid to the interior of the tube.

Figure 2:
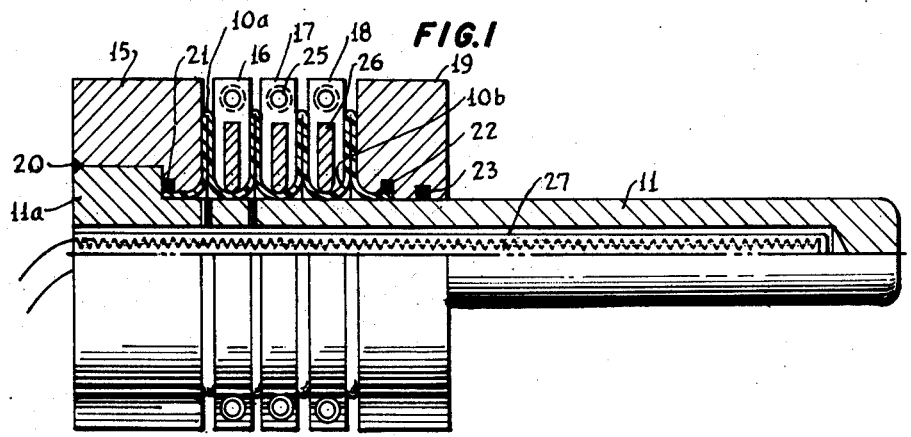
FIG. 2 is a view like FIG. 1 but showing a later stage of operations.

A plurality of die elements 15, 16, 17, 18 and 19 cooperate with the mandrel to form corrugations 10a on the tube, as shown in FIG. 2.

The base die member 15 may be secured to the base 11a of the mandrel, as by welding 20, and the die member has an annular groove carrying a seal 21, such as a rubber O-ring, which forms a fluid-tight connection when fluid under pressure is present in the tube. The tube end is easily pushed in past the ring when no pressure fluid is present and can readily be pulled out under the same conditions.

A similar seal 22 is provided in the other end die member 19. A seal 23 is provided between the die member 19 and the mandrel. By comparing FIGS. 1 and 2, it will be seen that the mandrel slides past the seal 23 during a corrugating action. To avoid fluid leakage when the mandrel is pushed out, the ports 13 are placed near the base end of the mandrel. If they should be placed all along the mandrel it would be necessary to provide a sealed enclosure on the outer end of the die element 19 to receive the end of the mandrel to prevent loss of fluid.

The intermediate die elements 16, 17 and 18 are formed in a plurality of circumferentially extending axially divided parts which are held together in use either by power means (for a fully mechanized press) or by connecting means such as bolts 25 (for a less automatic arrangement).

The intermediate die elements 16, 17 and 18 are provided each with an annular groove to receive a core ring 26. By "ring" is meant, as usual, an endless annular member which is threaded on the tube before the end die elements 15, 19 are placed on the tube and before the divided die elements 16, 17, 18 are put on the cores and their parts secured together on the cores. This may be of any material desired for a gasket core. Preferably it is resilient, as of cork, rubber, asbestos, or the like.

By forcing the die elements axially together in a press while fluid pressure is provided in the mandrel, the corrugations 10a are formed on the tube. For materials which need it, the mandrel is provided with heating means 27, here shown as an electric heater with conductor leads extending out at the left end, as shown. PTFE and other plastics which have memory are specially benefited by heating during formation and quenching after formation to cause them to hold their final shape.

Figure 3:
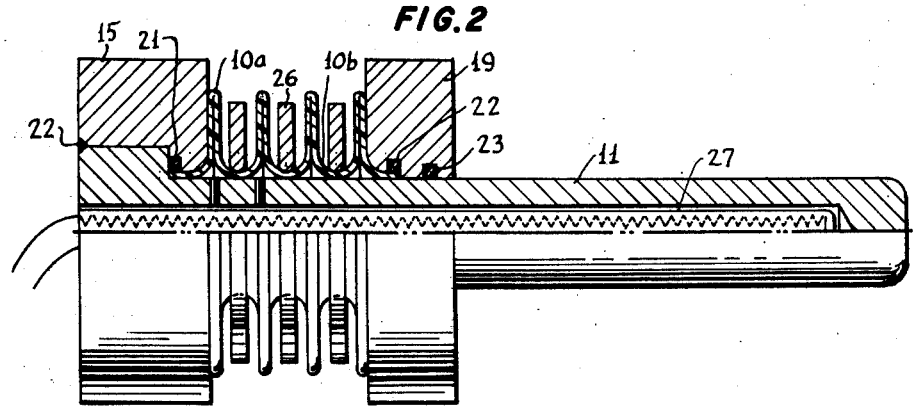
FIG. 3 is a view like FIG. 1 but showing a still later stage of operations.

After the corrugations 10a have been formed the intermediate die elements 16, 17 and 18 are removed, leaving flattened corrugations exposed, as shown in FIG. 3. It will be noted that the corrugations are wider radially than the cores so as to provide material for enveloping the peripheries of the cores.

Figures 4, 5, 6:
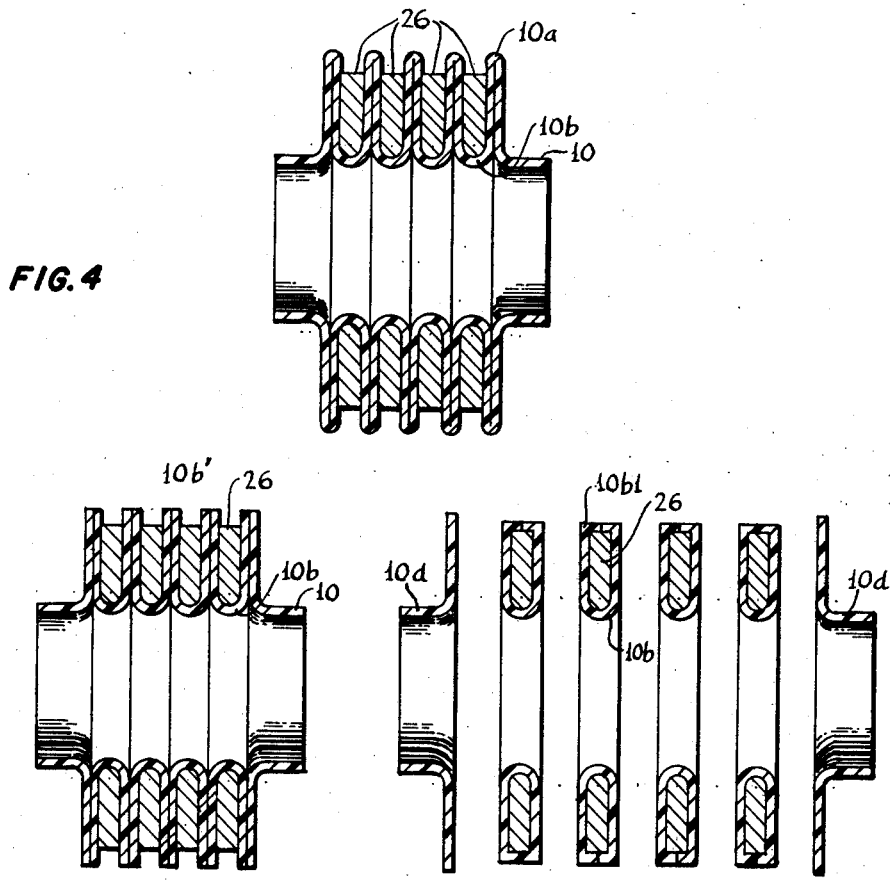
FIG. 4 is a section through the formed assembly removed from the machine after another operation has been performed by the machine.
FIG. 5 is a section like FIG. 4 after another operation has been performed.
FIG. 6 is a similar section after the final operation.

After the intermediate die elements 16, 17 and 18 have been removed the end die elements 15 and 19 are squeezed together axially to cause the corrugated tube to closely embrace the cores, as shown in FIG. 4.

The tube with the cores thereon and the end die element 19 can be quickly slipped off the mandrel after the forming operation and with pressure off so the tube can be quenched to stabilize the final shape. Easy set-up and removal provide rapid operations.

Next, the crests of the corrugations are cut open circumferentially, as shown in FIG. 5, to leave each core and its cover separated from the others. Each envelope is U-shaped in its annular cross section. These U-shaped annular envelopes may be designated as 10b. The end edges which protrude beyond the core may be designated as 10b1.

As shown in FIG. 6, these protruding end edges 10b1 are bent over the outer periphery of the core to fully cover it. The edges may be sealed together, as by heating to fuse them. When the gaskets are secured between parts in use it is not so essential that the outer edges be sealed together since the inner edge which encounters material inside a pipe is a continuous sheet. If the edges do not fuse together and are not readily joined by adhesive they may be held down by a band on the outer periphery.

Preferably the cores and finished sheathed gaskets are made to be slightly thicker axially at the inner radius than at the outer radius so that when squeezed between pipe flanges the tightening will begin at the inner radius and progress outwardly.

There is very little thinning of any part of the tube wall in this operation, such thinning as there is coming at the outer periphery of the corrugations to leave unthinned the valleys which wrap the iner edges of the cores. This is an advantage also in leaving the core coverings thinner toward the radially outer edges.

It will be noted that the ends of the tube 10d are left without cores. These need not be wasted because there are many uses for an angular-section gasket such as these will make.

If it is desired to make gaskets without cores by this method the cores are omitted and intermediate dies without an annular groove are used. Then when they are removed the corrugations will be completely flattened when pushed together.

If it were desired, the cores could be omitted at the start and when the shape of FIG. 3 was reached the cores could be supplied, as by winding material in the valleys or by filling them to the desired depth by fluent hardenable material.

It is thus seen that the invention provides improved apparatus and method for forming corrugated tubes and making gaskets and also provides an improved gasket which can be made at a low cost.

While one embodiment of the invention has been described for purposes of illustration, it is to be understood that there may be various embodiments and modifications within the general scope of the invention.

I claim:

1. The method of corrugating tubes, as for making gaskets with a sheathed core, which comprises, placing an annular core on a tube to be expanded, placing axially divided annular die elements over and around said core, supporting and holding the tube on either side of the die elements and core at such distance as to provide corrugations on opposite sides of the core which will be radially as deep as the core, applying fluid pressure within the tube while compressing it axially to form corrugations on each side of the die elements and core, removing the divided die elements from the core, and squeezing the corrugated tube axially to closely envelop the core in the annular valley space between corrugations.

2. The method as set forth in claim 1, further characterized by the fact that enough length of tube is left on each side of the core to form corrugations which when flatened are radially of enough greater depth than the core to provide sufficient material in the valley space between the flattened corrugations to completely surround the core.

3. The method as set forth in claim 1, further characterized by the fact that die elements are used which are axially wider than said core, that said corrugations are flattened by axial pressure while said die elements are still in place on the core, and that the portions of the tube on the sides of the core are squeezed axially upon the core after the die elements have been removed.

4. The method as set forth in claim 1, further characterized by the fact that die elements are used which are radially wider than the corrugations to be formed and axially wider than said core, that said corrugations are flattened by axial pressure between die elements, and that the portions of the tube on the sides of the core are squeezed axialy upon the core after the die elements have been removed.

5. Apparatus for corrugating tubes, as for forming gaskets, comprising in combination, a plurality of flat-sided die elements surrounding a tube at axially spaced points therealong, one of said die elements including axially divided parts having an inner groove embracing an annular core on the tube, which core is axially narrower than said divided die elements, to form corrugations axially spaced away from the core, and said divided die elements being removable from the tube to leave the annular core thereon, means to supply fluid under pressure within the tube to form corrugations on it, means for moving said die elements axially to assist in forming corrugations and flattening them between the flat sides of the die elements, and also for squeezing the core between corrugations after the core-embracing die elements have been removed from the core.

6. Apparatus as set forth in claim 5, in which said divided die elements are radially wider than the corrugations which are formed, and said annular core being radially narrower than the corrugations which are formed.

References Cited in the file of this patent

UNITED STATES PATENTS

| | | |
|---|---|---|
| 2,185,908 | Balfe | Jan. 2, 1940 |
| 2,347,101 | Harding | Apr. 18, 1944 |
| 2,446,281 | Harding | Aug. 3, 1948 |
| 2,580,546 | Hobson | Jan. 1, 1952 |
| 2,658,551 | Bender | Nov. 10, 1953 |
| 2,712,157 | Holte | July 5, 1955 |
| 2,774,621 | Kelbourne | Dec. 18, 1956 |
| 2,796,635 | Harvender | June 25, 1957 |
| 2,876,824 | West et al. | Mar. 10, 1959 |